United States Patent [19]

Lygren

[11] Patent Number: 5,160,620
[45] Date of Patent: Nov. 3, 1992

[54] METHOD AND APPARATUS FOR TREATING WATER

[75] Inventor: Eivind Lygren, Oslo, Norway

[73] Assignee: Sunfish, Ltd. A.S., Lysaker, Norway

[21] Appl. No.: 689,869

[22] PCT Filed: Dec. 7, 1989

[86] PCT No.: PCT/NO89/00126
§ 371 Date: Jun. 7, 1991
§ 102(e) Date: Jun. 7, 1991

[87] PCT Pub. No.: WO90/06288
PCT Pub. Date: Jun. 14, 1990

[30] Foreign Application Priority Data

Dec. 8, 1988 [NO] Norway .................. 88.5455

[51] Int. Cl.$^5$ ............................ C02F 1/24; C02F 3/06
[52] U.S. Cl. ........................... 210/608; 210/615; 210/629; 210/703; 210/151; 210/195.1; 210/221.2
[58] Field of Search ............ 210/608, 615, 629, 607, 210/151, 195.1, 197, 221.2, 703, 194, 620

[56] References Cited

U.S. PATENT DOCUMENTS

| | | | |
|---|---|---|---|
| 1,139,024 | 5/1915 | Frank .................. | 210/629 |
| 1,700,723 | 1/1929 | Imhoff .................. | 210/615 |
| 2,360,812 | 10/1944 | Kelly et al. .......... | 210/608 |
| 3,224,964 | 12/1965 | Derenk et al. ........ | 210/608 |
| 3,966,608 | 6/1976 | Mason et al. .......... | 210/157 |
| 4,563,277 | 1/1986 | Tharp .................. | 210/629 |
| 4,599,174 | 7/1986 | McDowell ............. | 210/629 |
| 4,696,740 | 9/1987 | Mochizuki et al. ...... | 210/151 |
| 5,061,368 | 10/1991 | Tada et al. ........... | 210/157 |

FOREIGN PATENT DOCUMENTS

| | | |
|---|---|---|
| 274083 | 7/1988 | European Pat. Off. . |
| 8707475 | 12/1987 | PCT Int'l Appl. . |
| 8809615 | 12/1988 | PCT Int'l Appl. . |
| 1442547 | 7/1976 | United Kingdom . |

OTHER PUBLICATIONS

"Lehr und Handbuch der Atwassertechnik", Jul. 1986, pp. 320–332.

*Primary Examiner*—Stanley S. Silverman
*Assistant Examiner*—Christopher Upton
*Attorney, Agent, or Firm*—Wenderoth, Lind & Ponack

[57] ABSTRACT

Contaminated water is caused to flow up through a chamber while aerated to produce air bubbles of a size mainly in the range of 0.03 mm to 1 mm by means of air diffusors disposed at the bottom of the chamber. Organic and inorganic impurities in the water is, by a combination of water flow, flotation and physical adsorption caused by the air bubbles, brought to the surface of the water in the chamber, where a foam containing dissolved impurities is formed and instantly removed from the chamber while a mixture of water particles and microscopic air bubbles is allowed to flow over a partition wall into an adjacent basin having a considerably larger volume than that of the chamber. In the basin a flotation process will take place causing a slurry to form on the surface of the water in the basin, which is removed, preferably at the end of the basin opposite the chamber. The rising air bubbles from the diffusor in the chamber causes the water to circulate through the chamber and basin, the chamber and basin communicating above and below the partition wall. Preferably a biofilter medium having upwardly extending, intercrossing channels is disposed in the chamber.

14 Claims, 2 Drawing Sheets

METHOD AND APPARATUS FOR TREATING WATER

BACKGROUND OF THE INVENTION (1) Field of the Invention

This invention relates to the treatment of water, particularly water intended for use in fish farming plants. More explicitly the invention relates to a method for water treatment comprising aeration of the water to be treated and causing the water to circulate to a chamber, into an adjacent basin of considerably larger volume than that of the chamber and back to the chamber, the aeration producing bubbles acting to form a foam containing dissolved impurities at the surface of the water in the chamber, and removing the foam from the chamber as it is formed.

(2) State of the Prior Art

Such a method is disclosed in Norwegian patent No. 58 996. According to this patent the circulation of the water is provided by an external water pump in which the air for aeration of the water is added before the water is ejected into an upper portion of the chamber just below the foam formed by the air bubbles.

It should be generally noted that water treatment based on air bubbles rising in water takes place by two strictly distinguished phenomena or mechanisms, termed flotation and physical adsorption, respectively, which, dependent on the size of the bubbles, take care of different forms of impurities in the water. Flotation is used to remove particulate organic and inorganic material suspended in the water, while physical adsorption extracts dissolved organic and inorganic substances in the water.

Flotation utilizes the ability of the suspended particles to rise to the surface of a liquid. For this to happen the density of the particles must be lower than that of the liquid or they must be able to be lifted to the surface by gas bubbles enclosing or adhering to the material, which settles as a slurry deposit on top of the water, from where it can be removed. However, the water surface must be relatively calm, as otherwise the slurry will disintegrate.

In physical adsorption, polarized compounds dissolved in the water associate with the air bubbles, which bring them to the surface where they are collected in a voluminous bubble foam that is easily removed.

The flotation process uses air bubbles ranging from about 0.03 mm up to about 0.12 mm in size, while the physical adsorption process is most effective with bubbles of a size around 0.8 mm.

Normally the air bubbles for flotation are produced by dissolving air in water that is put under a pressure of several atmospheres and then releasing the pressure to form slowly rising gas bubbles of the above size due to supersaturation. As an example of this flotation technique, refer to SE patent No. 169 561 which relies on the use of pumps, valves, water pipes and a pressure chamber. Also, in connection with fish farming, this conventional flotation method will poison the water if air is used as gas medium, since the water will become supersaturated with nitrogen gas.

The bubbles used in physical adsorption are normally produced by an air diffusor, i.e. a tube, hose or the like, having air permeable walls and positioned at the bottom of a column of polluted water. For a more detailed description of physical adsorption, refer to the book "Seawater Aquariums" by Stephen Spotte, John Wiley & Sons, 1979, p. 208-217.

A closer study of the description of the above Norwegian patent No. 58 996 will make it clear that, although it is not directly mentioned therein, the method of the patent obviously relies on physical adsorption of the dissolved substances rather than on flotation of particulates. It is mentioned that the bubbles in the surface foam easily burst and the foam collapses, which is typical for a foam formed through physical adsorption with large bubbles. Further, the tiny air bubbles (which could cause flotation) are considered to be a problem, and therefore should be removed by means of a sponge filter in the chamber while particulate material is removed by an external mechanical filter. Furthermore, the fact that the water is ejected into the chamber close to the water surface will cause turbulence, destroying any flotation effect that might emerge. Consequently the patent teaches that the foam has to be rapidly removed to prevent the impurities from returning into the water. (Physical adsorption, in contrast with chemical adsorption is a reversible process using weak bonds, such as those formed by van der Waals forces). Therefore, this prior water treatment method which, according to the patent, was proposed more than 50 years ago, does not produce water of a quality satisfying the demands of modern, full scale fish breeding plants. Because the retention time of the particulate material in the system is too long, and the material also accumulates within the fish basins. Furthermore, ammonia will also accumulate in the system.

SUMMARY OF THE INVENTION

The object of the present invention is to provide an improved water treatment method that, in addition to being less expensive than the prior method according to the above Norwegian patent, also gives a far better result as to the quality of the water.

This object is achieved by a method as mentioned in the introduction, that is characterized by creating the aeration and; circulation with an air diffusor located near the bottom of the chamber to produce bubbles therein of a size substantially the range of 0.03 mm to 1 mm. The larger size bubbles are effective to form the foam on top of the chamber. Remaining smaller size bubbles, together with particulates in the basin entrained in the water flow, form a flotation slurry at the surface of the water in the basin containing particulate impurities. The slurry is then removed from the basin.

Thus, contrary to what happens in the prior process of the Norwegian patent, according to the present invention the particulate material is continuously removed as soon as it is formed and is not allowed to disintegrate or accumulate in the fish tanks or basins.

Further advantages compared to the above prior technique are elimination of a need for any mechanical pumps to circulate the water or to pressurize the water to cause flotation. Also, the water layer at the top of the basin in which the flotation slurry containing the impurities is formed is not subject to turbulence interfering with the flotation process. By allowing the top water layer in the chamber to flow over into a adjacent, considerably larger basin, the flotation effect is optimized under the calm flow conditions prevailing in the basin, and preferably the flotation slurry is not removed until it has reached the other side of the basin opposite the chamber.

In a preferred embodiment of the method according to the invention, the water in the chamber is caused to flow upward through a biological filter medium (biofilter) further acting to remove dissolved organic matter in the water and to transform ammonium into nitrate. This latter effect is the most important one in this case since, as explained above, the dissolved organic matter is removed through physical adsorption. Further, ammonia is removed by the biofilter.

Admittedly, utilizing such a biofilter is not a new concept in connection with water treatment plants, in which the deposit on the filter, upon reaching a certain thickness, is broken away in smaller or larger bits or fragments that are entrained in the water stream to partly settle at the bottom of a suitable container or the like, from which the bits may be removed together with other foreign particles settled from the water. However, in a conventional installation 70-90% of the capacity of the biofilter is used to decompose dissolved organic matter, while 10-30% is used to remove ammonium. Also, some of the broken away material will tend to resist settling, and therefore flow with the discharge water to the recipient, or result in a poor quality of the water in the fish tanks. By using a biofilter in combination with the above described adsorption and flotation processes according to the invention, most of the capacity of the biofilter is utilized for removing ammonium, and consequently the size of the filter may be considerably reduced. Further, the cleaning effect of the filter is obtained without the need for a separate settling basin, since all of the material which is detached from the filter will be entrained in the upflowing water and consequently collected in the foam and flotation slurry, which is removed at a later stage.

Treating water by means of air diffusors of the type used in the invention is known per se, but only with a view to oxygenation and stripping of undesireable gasses such as $CO_2$ and nitrogen gas and for breaking away mat-growth on the biofilter. Examples of conventional biofiltering are also found in SE patents No. 169 561, 442 744, 386 658 and 382 321. However, none of these patents suggest biofiltering used in an advantageous combination with other water treatment processes, such as in the present invention.

The invention is based on the idea that the use of a particular air diffusor of a type known per se, which produces air bubbles of a size varying over a relatively wide range, will result in physical adsorption in addition to oxygenation, gas-stripping and mat-growth detachment, while the diffusor also serves to provide the required circulation of the water. In the preferred version of the invention, in which the water is caused to flow through a biofilter, the diffusor automatically tends to reduce the load on the biofilter with respect to decomposition of organic matter owing to the physical adsorption effect, and also provides for the required removal of mat-growth on the biofilter. Discharging the water from the chamber into a larger basin results in the further advantage that the polluted fragments that are broken away from the biofilter will also be entrained into the natural water flow and be floated in the basin, allowing the fragments to be removed by conventional weir technique rather than having to pump the water to a separate processing unit for separation, e.g. by settling or mechanical filtration. This, in turn, results in a lower pump energy demand than in a conventional water treatment plant based on separate processes with pumping of the water between the various processes. It should also be mentioned here that the treatment efficiency achieved by flotation on these types of particles, (mat growth particles and crushed organic small size particles) is extremely high compared to e.g. conventional sedimentation, and a sedimentation basin doing something close to the same job would normally have to be 10 to 20 times bigger. Thus, the invention provides a simple, compact and effective water treatment system basically consisting of a single processing unit with exceptionally low investment and operational costs compared to prior water treatment systems of a more recent type based on the normal use of sequential arranged unit processes.

The recirculation type water treatment plants for fish farming used until now normally are based on separate units for biofiltering, oxygenation, degassing of $CO_2$ and nitrogen gas and particle separation through mechanical filter mesh or by sedimentation. The costs of installation of such plants are very high and the energy consumption due to pumping is relatively large. As a typical example, Europe's largest recirculation fish farm plant of this kind (built in Farsund, Norway in 1985-86), having an effective fish basin volume of 1000 m³, cost 28 million NOK and has an energy consumption demand of about 300-400 kW for operation.

In comparison, a plant based on the present invention, which at present is being built with an effective fish basin volume of 2500 m³ (i.e. about 2.5 times larger than the prior plant) will cost about 11 million NOK and have an energy consumption of approximately 50 kW.

The invention also comprises an apparatus for carrying out the method according to the invention.

BRIEF DESCRIPTION OF THE DRAWINGS

An example of the invention will now be described more fully with reference to the accompanying partly schematic drawings in which.

DETAILED DESCRIPTION OF THE PREFERRED EMBODIMENTS

Figure 1:
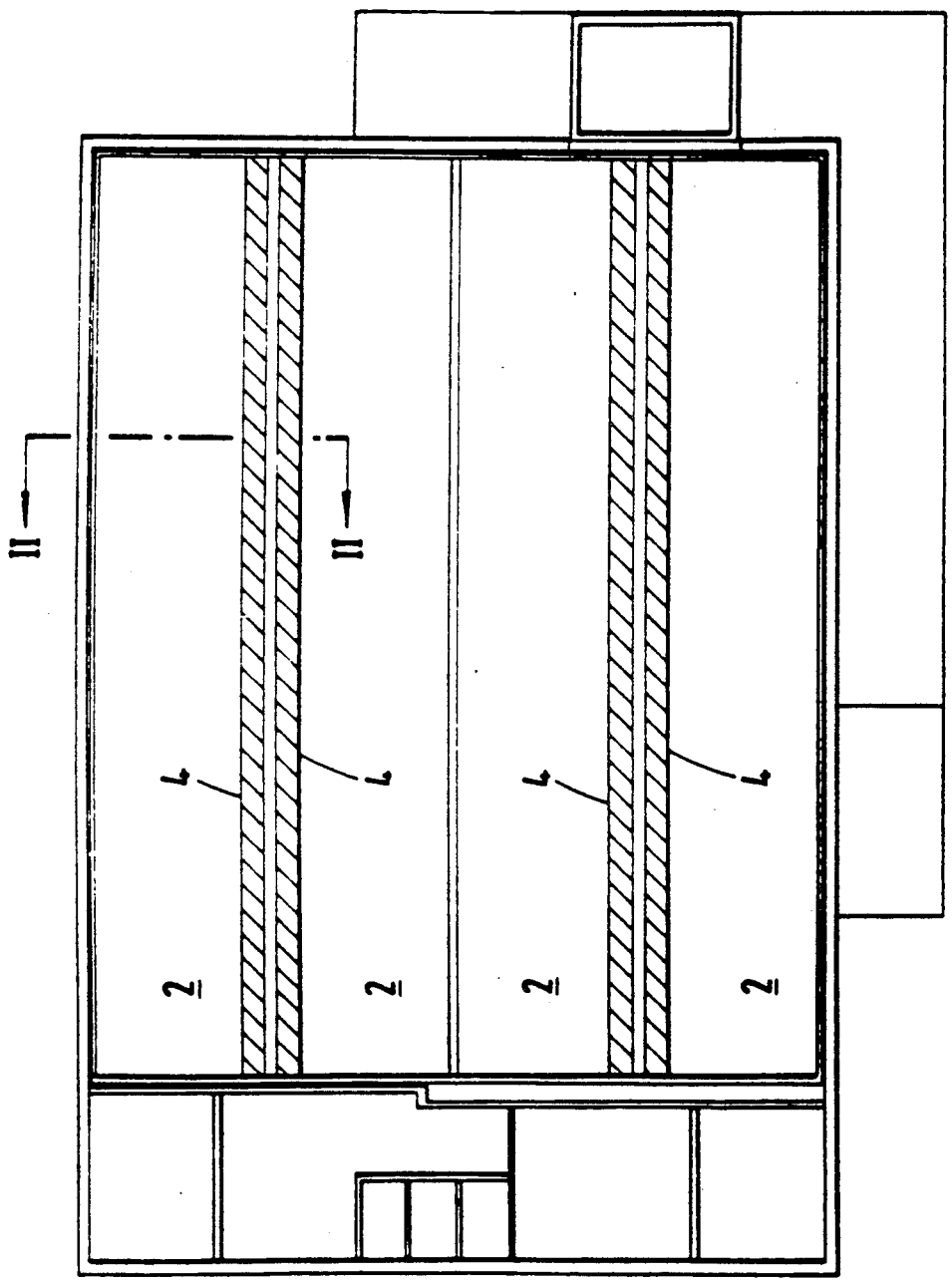
FIG. 1 is a plan view of a turbot fattening plant based on a method and plant according to the present invention.

The plant illustrated in FIG. 1 is conveniently comprised of e.g. four, substantially identical, rectangular, water filled basins or tanks 2, each comprising an independent fattening unit. Associated with each basin 2 is a chamber generally denoted by numeral 4 situated at one long side of the basin. In the embodiment as shown, the chamber 4 is laterally defined by one long wall and two end walls of the basin and an independent, longitudinal, impervious partition wall 6. However, if desirable, it may, of course, be defined by four separate walls independent of the walls of the basin. The upper and lower surfaces of the partition wall 6 are spaced from the upper edge and the bottom, respectively of the basin 2, so that the chamber 4 communicates with the basin 2 at the top as well as at the bottom thereof.

Disposed at the bottom of the chamber 4 there is, according to an important feature of the invention, an air diffusor 8 consisting e.g. of several pipes or hoses of which the walls are provided with a large number of minute apertures or pores capable of producing air bubbles in the range of about 0.03 mm to about 1 mm. Thus, the diffusor wall apertures should be microscopic, i.e. 0.1-0.3 μm, normally requiring the air blown therethrough to be pre-filtered in order to prevent clogging of the apertures or pores. As an example of a diffusor well adapted for use with the invention, refer to the diffusor sold under the trade name "Oxyflo", delivered by Gardentec of Sweden among others, which consists of stretched and oriented polyethylene fibers bonded together in a random pattern.

Preferably the chamber 4 is filled with a biological filter medium 12 (indicated by hatching in the drawings) held in place by support members 10, e.g. in the form of a screen. The surface area of the filter medium 12 should be as large as possible relative to its volume, with a view to microbiological growth. Preferably, the filter medium 12 is of a type which incorporates upwardly extending, intercrossing channels ("i.e. a cross flow system") in order to secure conditions promoting physical adsorption, to prevent the smallest air bubbles from attaching to the biofiltermedium, and to secure the supply of water and air to all parts of the filter. As an example of a suitable filter medium refer to the product sold under the trademark "Munters" supplied by AB Carl Munters, Sweden, or "Terrapac" supplied by Terracon, West-Germany.

The purpose of the basin 2 is partly to provide a retention time for the dirty water sufficient to secure an effective flotation process, partly to effect bi-processing purposes and partly to serve as a fattening tank, etc. The volume of the basin will depend on the water quality characteristics, the desired rest concentration, etc, and it has to be individually dimensioned in each separate case. Its shape will depend on the purpose, on whether the basin is outdoor or indoor, in existing buildings or whether the process is to be placed in existing basins etc. Thus, although the shape of the basin 2 shown in the drawings is rectangular, it is also possible to use e.g. a circular configuration, in which case also the chamber 4 normally will be circular and centrally arranged in the basin. When used for internal water treatment in fish farming the water basin 2 normally will function as a breeding tank.

Figure 2:
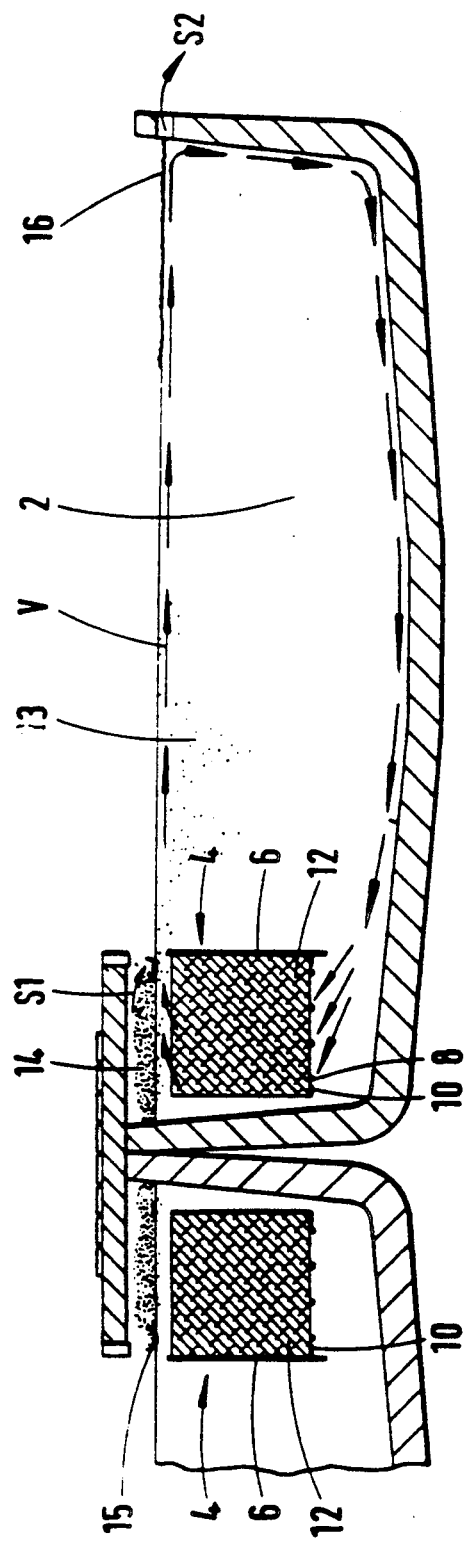
FIG. 2 is an enlarged scale cross-sectional view of the plant of FIG. 1 taken along line II—II of FIG. 1.

Somewhat simplified, what happens in the chamber 4 is as follows:

Owing to the air diffusor 8, polluted, low oxygen water is drawn (by means of the "mammut pump" or "air pump" principle) from the bottom of the basin 2 under the partition wall 6 and into the bottom of the chamber 4. The water passes up through the chamber and provides nourishment for a microorganism flora on the surface of the filter medium 12. This microorganism flora converts biodegradable dissolved organic matter to a mat-growth on the surface of the medium and transforms ammonium into nitrate form. The microscopic air bubbles from the diffusor 8 oxygenate the water, provides an ample supply of oxygen to the microorganism flora and breaks away the mat-growth when the latter has reached a certain thickness. An ample oxygen supply and limited mat-growth thickness are essential factors in order to achieve maximum microbiological growth. Physical adsorption of dissolved organic compounds is obtained (according to the literature reference mentioned in the introduction, most effectively with bubbles with a size of 0.8 mm) to form a bubble foam 14 containing dissolved substances from the water. The foam 14 is led by gravity into a channel 15 as indicated by arrow S1 and is then discharged from the plant for further sludge treatment. The strong water-air stream thus formed (which breaks away the mat-growth and also contains the particulate impurities that are drawn in at the bottom as indicated by the arrow V in FIG. 2) will also contain a large percentage of bubbles having an optimum size for flotation (0.03–0.120 mm). Even within the chamber 120 some of those bubbles will attach to the particulate material while the remaining minute bubbles will flow with the water-particle stream into the basin 2. In the latter basin the remaining minute bubbles will attach to particulate material 13. In the basin there are calm hydraulic conditions ideal for flotation of the particulate impurities, which ultimately will form a flotation slurry 16 which, owing to the natural flow of water in the basin, will flow to a place where it can be skimmed off by weir technique, as indicated with the arrow S2. When the water flow (provided by the air bubble pumping effect) reaches a wall surface in the basin 2, it will follow the wall down toward the bottom (see FIG. 2) and in the same manner return along the bottom back to the inlet of the chamber 4 under the partition wall 6. This bottom flow will pick up the particles settled on the bottom and bring them into the chamber 4 in which they, due to the above described processes, ultimately are incorporated in the flotation slurry. It should also be noted that, owing to the physical adsorption of dissolved organic substances, a considerable reduction of the size of the biofilter will be possible since the load on the biofilter will be reduced. As explained above, normally 70–90% of the capacity of the biofilter is used to break down organic matter, while only 10–30% is used to transform ammonium into nitrate.

All in all, a number of biological and physical-chemical phenomena interact in this method and provide a combined treatment result that until now no prior unit process has been able to provide.

The invention is applicable to virtually all types of waters in which it is desirable to remove biologically decomposable unstable organic matter, non-decomposable dissolved organic matter and particulate organic and/or inorganic suspended particles (even if these are microscopic and not easily settled). In addition, the process transforms the toxic ammonium compound into the more non-toxic nitrate form. The water should, however, not contain any compounds toxic to bacteria. The water treatment according to the invention is suitable for internal or external water treatment in fish farming plants and in treatment of municipal and industrial waste waters.

I claim:

1. A method of treating water, comprising:
providing a basin for containing and circulating water;
providing a chamber for aerating the water, said basin having a substantially larger volume than said chamber, and a diffusor at the bottom of said chamber;
circulating the water to said chamber from said basin, aerating the water, and returning the water to said basin by aerating the water with said diffusor, said diffusor producing, at atmospheric pressure, bubbles of a plurality of sizes throughout the range of 0.03 mm to 1 mm, including a substantial amount of larger size bubbles forming a foam at the surface of the water and a substantial amount of smaller size bubbles being entrained in the water flow through the chamber, returning to the basin and forming a flotation slurry;

forming a foam containing dissolved impurities of the water at the surface of the water in the chamber with said larger size bubbles;

removing said foam from the surface of the chamber;

forming a flotation slurry containing particulate impurities at the surface of the water in said basin with said smaller size bubbles; and removing said slurry from the surface of said basin.

2. The method of claim 1, and further comprising the steps of providing a biofilter medium in said chamber and causing the water circulating through said chamber to flow through said biofilter medium.

3. The method of claim 2, wherein said flotation slurry is removed from said basin at a point therein opposite of said chamber.

4. The method of claim 1, wherein said flotation slurry is removed from said basin at a point therein opposite of said chamber.

5. The method of claim 1, wherein said diffusor is a hose provided with pore apertures of 0.1–0.3 $\mu$m.

6. The method of claim 5, wherein air provided to said diffusor for aerating the water is prefiltered to prevent clogging of said pore apertures.

7. The method of claim 1, wherein said smaller size bubbles are 0.03–0.12 mm in size.

8. An apparatus for treating water, comprising:

a basin for containing and circulating water to be treated;

means defining a chamber having an open top, said means including a partition wall separating said chamber from said basin;

means for circulating the water to said chamber from said basin, aerating the water and returning the water to said basin, said means comprising a diffusor located at the bottom of said chamber constructed and arranged to produce, at atmospheric pressure, bubbles of a plurality of sizes throughout the range of 0.03 mm to 1 mm, including a substantial amount of large size bubbles providing means for forming a foam at the surface of the water and a substantial amount of smaller size bubbles providing means for forming a flotation slurry in said basin by being entrained in the water flow through said chamber and returning to said basin;

means for removing foam from the surface of the water in said chamber; and means for removing flotation slurry from the surface of the water in said basin.

9. The apparatus claimed in claim 8, wherein said air diffusor is a hose having pore apertures of 0.1 to 0.3 $\mu$m.

10. The apparatus of claim 9, wherein a biofilter medium is disposed in said chamber.

11. The apparatus of claim 10, wherein said biofilter medium has a plurality of upwardly extending channels therein.

12. The apparatus of claim 8, wherein a biofilter medium is disposed in said chamber.

13. The apparatus of claim 12, wherein said biofilter medium has a plurality of upwardly extending channels therein.

14. The apparatus of claim 8, wherein said diffuser is constructed and arranged such that said smaller size bubbles are 0.03–0.12 mm in size.

* * * * *